Jan. 8, 1963 A. A. GOLDBERG 3,072,753

APPARATUS FOR DUPLICATING MAGNETIC RECORDINGS

Filed Nov. 27, 1959 2 Sheets-Sheet 1

INVENTOR.
ABRAHAM A. GOLDBERG
BY Frank A. Steldt
ATTORNEY

Jan. 8, 1963 A. A. GOLDBERG 3,072,753

APPARATUS FOR DUPLICATING MAGNETIC RECORDINGS

Filed Nov. 27, 1959 2 Sheets-Sheet 2

INVENTOR.
ABRAHAM A. GOLDBERG
BY Frank A. Steldt
ATTORNEY

United States Patent Office 3,072,753

Patented Jan. 8, 1963

3,072,753

APPARATUS FOR DUPLICATING MAGNETIC RECORDINGS

Abraham A. Goldberg, Stamford, Conn., assignor to Minnesota Mining and Manufacturing Company, St. Paul, Minn., a corporation of Delaware Filed Nov. 27, 1959, Ser. No. 855,574

3 Claims. (Cl. 179—100.2)

Figure 1:
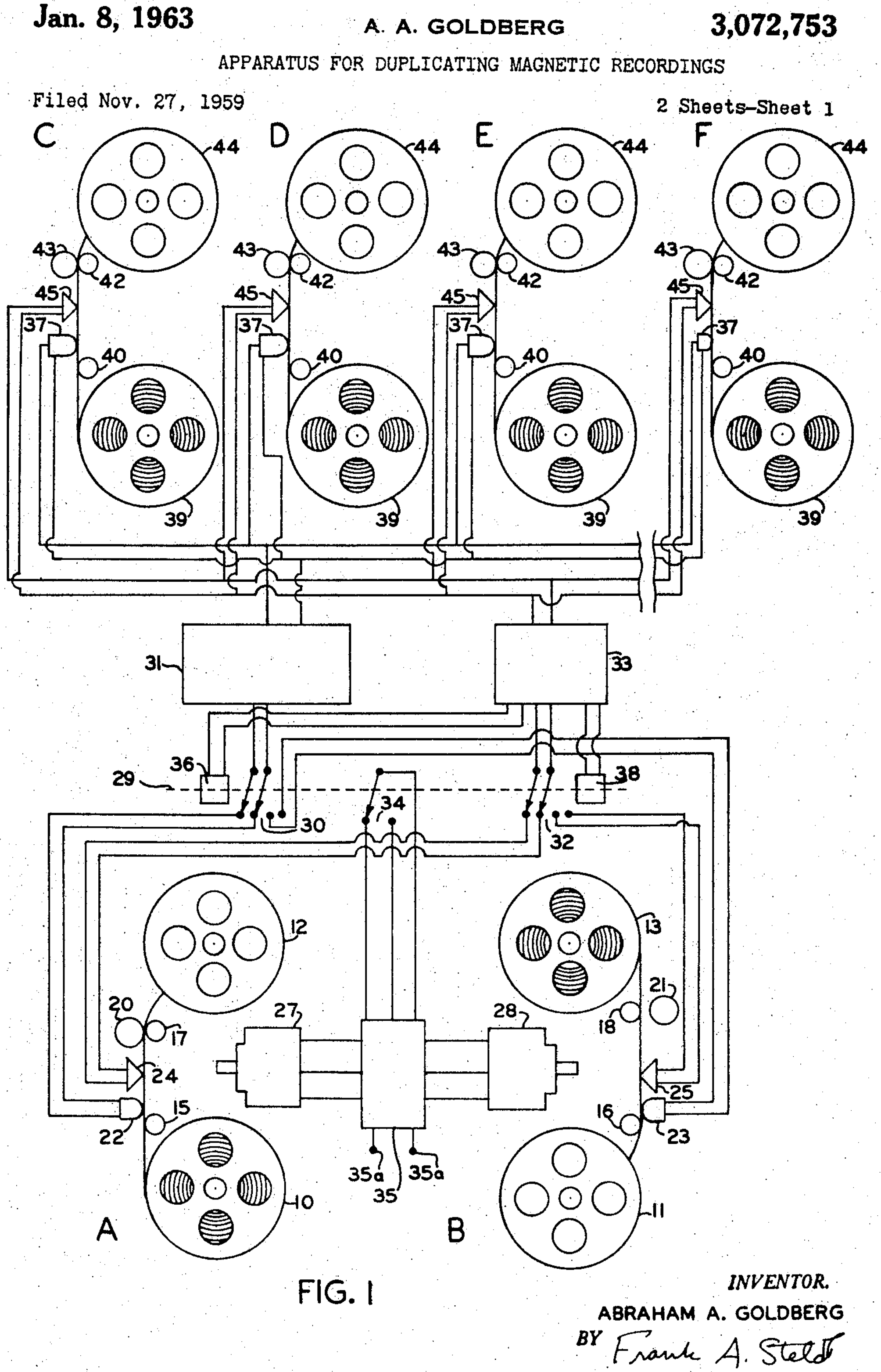

This invention relates to systems for the recording of magnetic strip record producing means, and more particularly to methods and apparatus for rapidly producing multiple duplicate copies of original source programs recorded upon magnetic tapes.

The production of magnetic strip sound records is well known and a number of methods have been proposed for duplication of master program sources on such magnetic strip materials. However, in the high speed mass production of magnetic tape records from such program sources it is difficult to preserve adequate fidelity of reproduction with best economy when start and stop methods of recording involving individual program units are resorted to.

It is an object of the present invention to provide a process for producing large numbers of recorded duplicate sound records upon magnetic tape means from original master sound sources on magnetic tape means, simultaneously, uniformly and with a high degree of fidelity relative to the original sound. It is another object of the invention to provide a process for duplicating magnetic strip sound records which operates substantially continuously. A further object of the invention is to provide a duplicate record of a master sound program upon magnetic tape recording means, which record contains multiple programs separated by unrecorded tape upon which is carried a synchronization signal. A still further object of the invention is to provide apparatus for carrying out the processes described. Other objects of the invention will be apparent from the disclosure hereinafter made, and from the description of the invention as shown in the accompanying drawings.

In accordance with the above and other objects of the invention, there is provided a recording system and apparatus in which two independent master magnetic strip sound record program sources of high fidelity, previously recorded at a relatively high tape speed, which are provided with a synchronization signal closely following the end of the program upon the tape, are employed alternately as sound record sources for duplication, at a program reproduction station. These program sources are reproduced for copying at a tape speed which is a multiple of the rate at which the program sources were originally recorded. The signal thus generated is amplified and conducted to a series of duplicating stations, at each of which a magnetic head records magnetic impulses upon reels of magnetic tape intended for playback at a speed substantially slower than that at which the master sound sources are intended for playback, but which are travelling at a rate which is the same multiple of the intended playback rate as the multiple rate at which the master source tape is being operated. At each recording station, a signalling means activated by a synchronization signal-producing means controlled by the master synchronization signal pickup means at the master sound source playback station is provided in operative relationship to produce a synchronization signal upon the duplicated tape at the completion of copying the master source program.

In operation, the two master source program tapes are copied alternately, one of the tapes being rewound while the other is being reproduced. However, the tapes to be duplicated continue to receive the master sound program without interruption of their transport past the recording heads. In this way, the disadvantages of starting and stopping, such as wasteage of tape at the beginning and end of recording, as well as possible introduction of flutter and the like, are avoided.

Important parts of the system are the synchronization signals. The primary or master synchronization signal, which is present on the master program source, operates to stop the master source tape at the end of the program material and initiate rewind of that tape while simultaneously starting the reproduction of the second master program source, switching the circuit to recording of the second master program source, and impressing a secondary synchronization signal on the recorded duplicate tape; and at the same time providing switching operations for the program input to the amplifier and for the input of the synchronization signal to the signal sensing means and the secondary synchronization signal producing means. In this way, recording of the master sound programs is continuous so long as unrecorded magnetic tape is supplied to the recording station.

Following completion of recording of the available tape at the recording station, the recorded tape copies, now provided with magnetic records of multiple programs having secondary synchronizing signals between them, is transferred to a separating and loading station where the recorded tape is placed upon individual reels or the like each of which contains the individual programs. The secondary synchronization signal is now detected and employed as a means for initiating the severing of the tape between the programs. In this way, the programs are simultaneously and automatically rewound in the proper direction for replay and separated into individual units.

Figure 2:
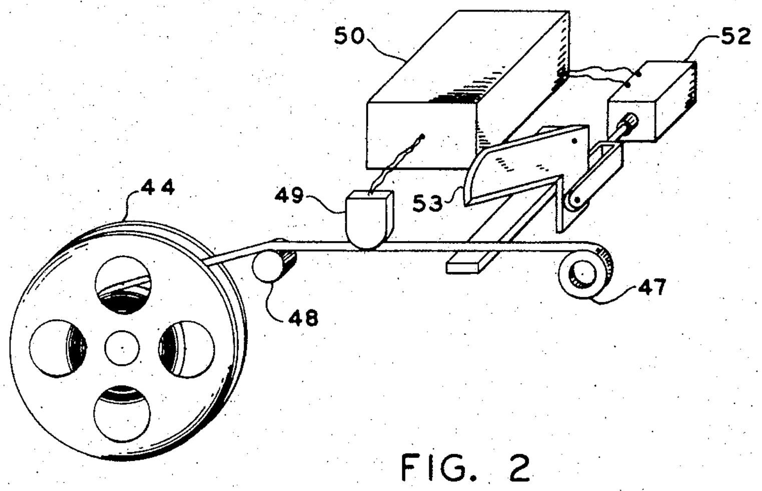

The invention with respect to the system for duplicating magnetic recordings will be readily understood from the following description, in connection with the accompanying drawings, in which:

FIGURE 1 is a diagrammatic illustration of the reproducing and recording station of an embodiment of the system of the invention; and FIGURE 2 is a diagrammatic view in perspective of a portion of a separating and loading station.

Referring to FIGURE 1, there is shown schematically at A and B a pair of master sound program source magnetic tape records contained upon supply reels 10 and 11, program A being shown in the course of reproduction and program B being shown in the rewinding phase. The programs may be the same or different, but conveniently for mass production of duplicates they are the same program. The tapes upon being reproduced are driven at a predetermined constant lineal speed by conventional means not here detailed and wound upon the usual takeup reels 12 and 13. The drive system may be conventional, employing suitable guide rollers as at 15 and 16, the predetermined lineal velocity being imparted to the tapes by capstans 17 and 18 when the tapes are urged against the capstans by pinch wheels 20 and 21. Pinch wheel 21 is shown disengaged from the capstan and tape, so as to provide for easy rewind. The driven tape passes over pickup heads 22 and 23, and synchronization signal detectors 24 and 25. The power source for the capstans, and for takeup rewind purposes, are motors 27 and 28, here shown schematically, but which are suitably connected to the driving and takeup means by conventional methods. Pickup heads 22 and 23 are electrically connected through gang switch 29 to amplifier 31 through switch element 30, which is adapted to connect either head 22 or 23 to the amplifier. In similar manner, synchronization signal detectors 24 and 25 are connected through switch element 32 to synchronization pulse analyzer and reproducer 33. Gang switch 29 is conveniently operated by solenoid means 36 and 38, which are activated by electrical current provided through suitable electronic circuitry in signal pulse analyzer 33. Switch element 34 of gang switch 29 is connected to motor control unit 35, which has power leads 35*a*. Motor control unit 35 is connected to a source of electric current and is adapted to start, stop and reverse motors 27 and 28 and to provide mechanical means for initiating and disconnecting capstan and reel drive according to the requirements of the drive, takeup and rewind systems.

The amplified signal from the master sound program sources is conducted to recording heads 37 of a number of slave recording units indicated at C, D, E, and F, which form the recording station. While four units are shown, any number can be used commensurate with the power of the amplifier to provide useful levels of output to the recording heads 37. Each slave unit is provided with a supply reel 39 containing a supply of unrecorded magnetic tape, suitable guide rollers as exemplified by rollers 40; capstans 42 and pinch wheels 43 for driving the tape at the predetermined lineal speed, and takeup reels 44. The capstan and takeup reel can be driven by conventional means not shown here. Each slave unit is also equipped with synchronization pulse recorder 45. Desirably, at least enough unrecorded tape is provided on supply reels 39 to permit of recording ten master programs without interruption.

Referring to FIGURE 2, there is shown a portion of a rewinding and packaging station at which a filled take-up reel 44 after copying of a number of master program sources in succession, and having synchronization signals thereon between the said individual program copies, is rewound upon suitable hubs or spools 47, for ultimate packaging. Hub 47 is provided with conventional drive means not shown, for example, belt and pulley drive from an electric motor which powers the hub for rewinding the recorded tape. Suitable guide rollers as at 48 are provided. In operative position with respect to the recorded tape is a synchronization pulse detector 49, connected electrically to a synchronization pulse analyzer 50. A solenoid or other means 52 is actuated by synchronization pulse analyzer 50, to power tape severing means 53.

The operation of the system is as follows: Referring again to FIGURE 1, master program source tape A is positively driven at a predetermined lineal speed by capstan 17 and pinch roller 20 past the pickup head 22. The speed employed is a multiple of the speed at which the program was recorded. For example, using a master tape recorded at a speed of 15 inches per second, and employing a multiple of 10 times the original rate, the speed of the tape past the head 22 is 150 inches/second. In this way, the frequency of the signals detected by pickup head 22 is increased from the normal 30 to 15,000 c.p.s., to 300 to 150,000 c.p.s. This signal is amplified in the usual manner, and impressed upon recording head 37 of the slave units. At the slave units, the tape to be recorded is driven positively by capstant 42 and pinch-wheel 43 to provide a linear speed which is a 10-fold multiple of the 1.875 inches/second speed at which it is desired to reproduce these duplicate recordings. In the present instance, the supply tape is thus driven at a linear speed of 18.75 inches/second, the recording heads being provided with a bias of 1 megacycle and being capable of a frequency response of 300 to 150,000 c.p.s. The master sound source A is provided with a synchronization signal at the end of the program portion of the record. This synchronization signal may be a magnetic record of an audio signal of particular frequency and intensity, which is detected by a magnetic pickup head and filter means, or a visual signal such as a punched-out hole in the tape or a reflective coating, which are detected by use of a light source and a photoelectric means, or even an electrically conductive area on the tape which can be detected by the usual sensing mechanism in which an electrical circuit is closed by such conductive means. Whatever the means used, the synchronization pulse or signal is conducted to synchronization pulse analyzer and reproducer 33. At this point, detection of a synchronization pulse results in substantially simultaneous initiation of a number of operations. Initiation of a secondary synchronization signal to be impressed upon the duplicate tapes is the first action. The solenoid means 38 is activated to throw gang switch 29 to its alternate position. By means of the switching arrangement shown, the motor and drive control 35 is activated so that the motor drive for takeup reel 12 and capstant 17 is stopped, the pinch wheel 20 is disengaged from the tape as shown at 21, and rewind of the tape is initiated. At the same time, the second master sound program source B (which is shown in FIG. 1 in condition for rewinding, but which is now assumed to have been completely rewound) is put into motion and reproduction is started. The forward drive mechanism consisting of capstan 18, pinch wheel 21 and take-up reel drive is actuated, to drive the master program tape B at the same linear speed as program A was driven, while at the same time pickup head 23 is connected through switch element 30 to amplifier 31, thereby disconnecting pickup head 22 from said circuit. Synchronization pulse reproducer 33 has meanwhile impressed a second synchronization pulse of short duration upon the tape being recorded by the slave units, through synchronization pulse generator 45. For example, the signal generator may be arranged to place a conductive area, such as a rapidly drying conductive paint, on the tape. A revolving punch wheel may also be employed to punch a hole or holes in the tape. Conveniently and preferably the secondary synchronization signal consists of a low frequency signal which is below audio level, i.e., about 10 to 20 cycles/second, which is magnetically recorded on the tape. The primary synchronization signal detector 24 is disconnected from the circuit and primary synchronization signal detector 25 is connected to the circuit in operation by switch element 32. Thus, by means of the sequence of operations initiated by the primary synchronization signal, a secondary synchronization signal is impressed upon the duplicate tape recordings in the slave units which continue to be driven at the same predetermined rate, signals from master record source A are disconnected from the circuit and rewinding of master recorded source A is initiated, master record source B is connected to the circuit and the reproduction of the master program source B commences. Rewind of the program source A takes place at a speed greater than the predetermined linear forward speed, so that the program source A will be rewound and in condition for replay by the time source B has been duplicated upon the slave units.

At completion of the recording of program source B, when the primary synchronization signal on that tape is detected by synchronization signal detector 23, the sequence of operation described above in connection with completion of recording of program source A is repeated except that the corresponding operating means are those connected with program source B. Sequence switch 29 is actuated by solenoid 36, a secondary synchronization signal is impressed on the tape in the slave units, forward drive of program source B is stopped and rewind initiated, program source A is set in forward motion and reproduction of this program begins. A short unrecorded length of tape at the lead end of the master programs permits constant speed to be attained before signals are recorded. Alternating the reproduction of the master source programs in this way results in continuous duplication of the program, so long as supply reels 39 of the slave units contain unrecorded tapes.

It will be apparent that additional master program sources can be provided, if desired, which are reproduced in sequence by the same means as shown, so that three or more master program sources are used instead of two. Such addition is of course clearly within the scope of the invention. However, the apparatus described herein using two master program sources is simple and convenient and generally speaking accomplishes the objects of the invention in the most practical manner.

The program sources which are supplied can of course be provided with one or more recorded tracks upon the tape. Thus, if a program source having two tracks is to be duplicated, as for the purpose of providing stereophonic sound reproduction, it is apparent that stereo pickup heads can be employed, connected to separate amplifiers and two magnetic recording heads, which are recorded upon the tape in the same way as a single track.

The apparatus shown in the drawings uses a single magnetic recording head for duplicating a master source program upon a tape of width suitable for end use, but as will be set forth in more detail hereinafter, a number of magnetic recording heads in adjacent relationship can be provided at each slave unit, recording separate program tracks upon a single tape which is wide enough to accommodate the corresponding number of tracks, and the wide tape is then slit lengthwise into individual duplicate records before packaging for use by the consumer.

While the amplifier unit 31 is shown diagrammatically, being of conventional construction and circuitry, it will be understood that such amplifier units preferably include filter networks, tone, volume, equalization and level control mechanisms and the like as required to provide a maximum degree of fidelity of recording on the duplicate magnetic tapes. Furthermore, high frequency oscillators are provided to feed high frequency voltage into the magnetic record heads 37, thereby providing high frequency bias to produce a maximum degree of fidelity in the magnetic record.

The rewind and separation station shown in FIGURE 2 makes use of the secondary synchronization pulse derived from the primary synchronization pulse to provide for automatic separation of the duplicated programs from each other. In this way, the utmost in economy of tape is realized, since there need be no large gap between the recorded programs on the tape utilized in the slave units. Following winding of the recorded programs on the hub or other reel, the program is in condition for reproduction upon suitable reproducing equipment. The hub may be enclosed in a case, for use as a magazine or cartridge, if desired. It will be apparent that upon replay at the intended lower speed; here, for example 1⅞ inches per second, the program source will be reproduced at the same frequency at which it was recorded.

Alternatively to the recording of a program upon a magnetic tape of a width adapted for ultimate use, as described above, the system of the invention can be employed for recording a multiplicity of tracks on wide tapes, which are slit to proper size before end use. For example, five pairs of magnetic recording heads are employed, located side by side, one member of each pair receiving one side of a stereo program and the other receiving the other side of a stereo program, from a stereo program source. The stereo pairs record in adjacent tracks on a tape which is wide enough to accommodate ten tracks. It will be seen that the resulting tape record contains 5 complete stereo programs, all from the same master program source. After recording, and prior to packaging, the wide tape is in this instance slit into 5 separate recorded tapes, each having a single stereo program. The output of each slave unit can in this way be multiplied several fold, without requiring additional drive and take-up mechanism.

Similarly, programs employing several tracks can be recorded in multiple, as, for instance, where the master program consists of three tracks, two being the usual stereo tracks and one (preferably the center track) being a delayed, reverberated signal which, when the program is played back, imparts greater realisms to the reproduced sound. In this instance, recording head units consisting of a pair of stereo heads and a delay head are used to record the three tracks which make up each duplicate. Five of such units are placed side by side and record upon a single tape of sufficient width to accommodate the fifteen tracks. Following completion of the duplication, the tape is slit into five tapes, each having a single program recorded on three tracks.

When individual programs which are duplicated require recording on more than one track, as for recording of stereo programs and the like, it is of course only necessary to impress the primary and one secondary synchronization signals upon one of the tracks.

While the multiple of normal playback linear speed use for reproduction or duplicating has been hereinabove exemplified by ten times normal playback speed in the description of the new system, it is obvious that multiple rates as high as 15 to 20 times that of normal playback speed are feasible, particularly where requirements of fidelity of sound reproduction are less stringent. Preferably, a multiple rate in the range of 5 to 10 times normal playback speed is used in the process of the invention.

What is claimed is:

1. In a system for recording from master program sources, the combination of a first and a second master magnetic strip sound record program sources having a primary synchronization signal means at the end of each sound record, said program sources being driven during reproduction thereof at a constant linear speed which is a predetermined multiple of the original recording speed, only one of said sources being reproduced at a given time; a magnetic pickup head associated with each of the said sources and connected with means for amplifying the program signals; a plurality of magnetic recording means connected with the output of the said amplifier for recording said signals upon each of a plurality of magnetic copy strips; the said copy strips being of a length great enough to accommodate multiple programs of the duration of the sources, and being driven at the same predetermined multiple of the predetermined playback speed as the program sources; sensing means associated with the said program sources to detect the primary synchronizing signal and in response thereto substantially simultaneously initiate the impression of a secondary synchronization signal upon the copy strips, stop the forward running and reproduction of the first program source, initiate rewinding thereof, and start the forward running reproduction of the second program source; and adapted to repeat the said simultaneous operations upon sensing of the primary synchronizing signal of the second program source, to initiate reproduction of the first program source.

2. In a system for recording from master program sources, the combination of a first and a second master magnetic strip sound record program sources recorded at a constant linear speed of 15 inches per second and having a primary synchronization signal means at the end of each sound record, said program sources being driven for playback at a predetermined constant speed which is from about 5 to 10 times that of the original recording speed, only one of the sources being reproduced at a given times; a magnetic pickup head associated with each of the program sources and connected with means for amplifying the program signals; a plurality of magnetic recording means connected with the output of the amplifier for recording the signals upon each of a number of magnetic copy strips, the copy strips being of a length great enough to accommodate multiple programs of the duration of the sources, being driven at the same predetermined multiple of 1⅞ inches per second as the program sources; primary synchronizing signal detecting means connected with means operative to substantially simultaneously stop the forward running of the program source playback drive means and initiate rewinding thereof, impress a secondary synchronization signal upon the copy strips, disconnect the pickup head associated with the reproduced source from the amplifier, disconnect the synchronization signal detector from the operating means, start the reproduction of the second program source, connect the pickup head associated with the second source to the amplifier, and connect the synchronization signal detector means associated with the second source to the said operating means; whereby the simultaneous operations which take place upon completion of recording of the second program source will initiate reproduction of the first program source.

3. In a system for recording from master program sources, the combination of a first and a second master magnetic strip sound record program sources having a primary synchronization signal means at the end of each sound record, said program sources being driven during reproduction at a speed which is a predetermined multiple of the original recording speed, only one of said sources being reproduced at a given time; magnetic pickup heads associated with each of the said sources and connected with means for amplifying the program signals; a plurality of magnetic recording means connected with the output of the said amplifier for recording the signals upon each of a plurality of magnetic copy strips, the said copy strips being of a length great enough to accommodate several programs of the duration of the sources and being driven at the same predetermined multiple of the predetermined playback speed as the program sources; primary synchronizing signal sensing means adapted to operate in response thereto and substantially simultaneously produce operations which impress a secondary synchronization signal upon the said copy strips, stop the reproduction of the first source, initiate rewinding thereof, and start the reproduction of the second source; whereby a number of master source programs are recorded continuously and seriatim upon the said copy strips and having secondary synchronization signals between the duplicated programs on each individual copy strip; reeling means for winding the copy strips upon individual reels for ultimate use, secondary synchronization signal sensing means for detecting the said secondary synchronization signal sensing means for detecting the said secondary synchronization signal, and means controlled by the said sensing means for severing the copy strip at that point.

References Cited in the file of this patent

UNITED STATES PATENTS

| | | |
|---|---|---|
| 2,410,569 | Conant | Nov. 5, 1946 |
| 2,560,234 | Masterson | July 10, 1951 |
| 2,604,549 | Begun | July 22, 1952 |
| 2,615,989 | Thad | Oct. 28, 1952 |
| 2,734,948 | Mueller | Feb. 14, 1956 |
| 2,786,895 | Rettinger | Mar. 26, 1957 |